Patented Sept. 4, 1934

1,972,605

UNITED STATES PATENT OFFICE 1,972,605

PREPARATION OF DI-DIPHENYL OXIDES

Wesley C. Stoesser and Robert F. Marschner, Midland, Mich., assignors to The Dow Chemical Company, Midland, Mich., a corporation of Michigan No Drawing. Application July 26, 1930, Serial No. 471,084

10 Claims. (Cl. 260—150)

The present invention concerns methods for the preparation of di-diphenyl oxides, particularly the preparation thereof by reacting a halodiphenyl with a base, and more particularly by heating a halodiphenyl with an aqueous alkalimetal hydroxide under pressure.

Hale and Britton (Ind. Eng. Chem. 20, 114: 1928) suggest that the waste tar, obtainable from a process whereby chlorobenzene is hydrolyzed to phenol, contains compounds of the di-diphenyl oxide class. Those authors, however, do not describe any member of said class, nor do they in any way suggest that a di-diphenyl oxide compound has ever been isolated and identified as such. We have now found, that by reacting a halodiphenyl with approximately its molecular equivalent of a hydrolytic base, di-diphenyl ether may be prepared in good yield. Furthermore, the yield of the latter can be materially increased by adding a phenylphenol to the reaction mixture for the purpose of depressing the formation of substantial amounts of the same in the desired hydrolytic reaction, hence allowing the halodiphenyl to form chiefly the desired di-diaryl oxide.

Our invention, then, consists of the improved method and steps hereinafter fully described and particularly pointed out in the claims, the following description setting forth in detail several modes of carrying out our invention, such disclosed modes illustrating, however, but a few of various ways in which the principle of the invention may be used.

In general, in carrying out our improved method, a halodiphenyl, such as ortho- or para-chlorodiphenyl, is reacted with approximately its molecular equivalent of a suitable alkali such as aqueous sodium hydroxide or carbonate under pressure and at a relatively high temperature, that is, at about 350°–425° C., and preferably with agitation of the reaction mixture. The principal reaction which occurs is illustrated by the equation:—

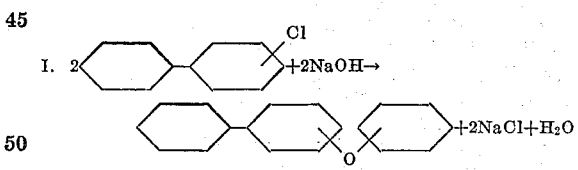

Any great excess over the stated proportion of the hydrolytic base is to be avoided, since otherwise the oxide product will react therewith to form phenylphenate, as indicated by Equation II:—

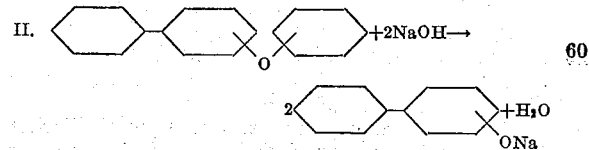

As mentioned above, the reaction illustrated by Equation II can largely be avoided by adding phenylphenol to the initial reaction mixture. The phenylphenol is preferably added in amount approximately equivalent to that ordinarily formed in the reaction when phenylphenol is not initially added to the mixture. Catalysts, such as finely divided copper or an alloy thereof, may be employed to promote rapid reaction, but their use is not essential. The oxide product may be separated from the aqueous reacted mixture by usual procedure, e. g. extracting the mixture with a water-immiscible solvent such as benzene and fractionally distilling the extract to recover the oxide dissolved therein.

The following examples illustrate several ways in which our invention may be carried out:—

Example 1

1⅓ mole ortho-chlorodiphenyl was heated for 1 hour at 390°–400° C. with 1 mole sodium hydroxide (5 per cent aqueous solution) in a rotating iron bomb. The latter was then cooled, the contents removed, and extracted with benzene. The extract was fractionally distilled whereby the ortho-phenylphenol and di-ortho-diphenyl oxide products were obtained separately in yields of 35 per cent and 60 per cent of theoretical, respectively. A small proportion of tar remained in the still after the distillation. The di-ortho-diphenyl oxide product boiled at 414°–416° C. at atmospheric pressure.

Example 2

1 mole ortho-chlorodiphenyl was reacted for 1½ hours at 380°–390° C. with 1½ moles sodium carbonate (20 per cent aqueous solution), in a rotating copper bomb. The reaction product was worked up as in the above example, di-ortho-diphenyl oxide being obtained in approximately a 65 per cent yield.

Example 3

Para-chlorodiphenyl was reacted under the same conditions as given in Example 2. Di-para-diphenyl oxide, boiling at 463°–465° C., under atmospheric pressure, was obtained thereby in an approximately 60 per cent yield.

*Example 4*

In similar fashion as in Example 1, 94 grams (0.5 mole) of ortho-chlorodiphenyl was reacted with 15 grams (0.375 mole) of sodium hydroxide dissolved in 135 grams of water. To this mixture was added 0.15 mole of sodium ortho-phenylphenate, prepared by reacting the theoretical amounts of the free phenol and sodium hydroxide, for the purpose of repressing the further formation of substantial amounts of such free phenol. The mixture was heated for 1 hour at a temperature of 385°–392° C. Unreacted chlorodiphenyl was recovered to the extent of 30 per cent of the amount added. From the reacted chlorodiphenyl there was obtained di-ortho-diphenyl oxide in a 94 per cent yield, approximately 2.5 per cent of ortho-phenylphenol and about 3.5 per cent of tarry residue.

In the above examples, the conversion of chlorodiphenyl into di-diphenyl oxide and phenylphenol was practically quantitative, the amounts of the latter being substantially the difference between 100 per cent and the above given percentages of oxides.

The di-diphenyl oxides are recrystallizable from organic solvents such as acetic acid or chlorobenzene, and have the properties noted in the following table:—

| Compound | Melting point | Boiling point atmospheric pressure |
|---|---|---|
| o-o'di-diphenyloxide | 117–118° C. | 414–416° C. |
| p-p'di-diphenyloxide | 199–200° C. | 463–465° C. |

In general our invention relates to an improved method for preparing a di-diphenyl oxide, wherein a halodiphenyl is reacted with approximately its molecular equivalent of an aqueous hydrolytic agent, e. g. an aqueous sodium hydroxide or carbonate solution, the reaction mixture is preferably agitated during reaction, and the formation of substantial amounts of phenylphenol is preferably avoided by adding phenylphenol to the initial reaction mixture.

In the claims, it is to be understood that the expression "alkali-metal base" is intended to include compounds such as sodium carbonate, bicarbonate, or hydroxide.

If desired, in carrying out our above described invention, the process may be operated in a substantially continuous manner as regards the phenylphenol by-product. That is, the latter may be removed from the reaction mixture and returned to the process by adding the same to a new batch of reactants. Or, if the phenylphenol be removed from the reaction mixture as a soluble salt thereof, e. g. an alkali-metal salt, the latter may be returned to the process as such, or it may be converted into the free phenylphenol before being returned.

Other modes of applying the principle of our invention may be employed instead of those explained, change being made as regards the steps herein disclosed, provided the details stated by any of the following claims or the equivalent thereof be employed.

We therefore particularly point out and distinctly claim as our invention:—

1. The method of making a di-diphenyloxide which comprises reacting a halodiphenyl with an aqueous solution of an alkali metal base, the base being employed in amount not greatly exceeding the molecular equivalent of said halodiphenyl, and the reaction being carried out under super-atmospheric pressure at a temperature between about 350° and about 425° C.

2. The method of making a di-diphenyl oxide, which comprises reacting a chlorodiphenyl with an aqueous solution of an alkali-metal base in an approximately equimolecular ratio, and substantially repressing the formation of phenylphenol by addition of the latter to the reaction mixture, such reaction being carried out under super-atmospheric pressure and at a temperature between 350° and 425° C.

3. The method of making a di-diphenyl oxide, which comprises heating a chlorodiphenyl with an aqueous solution of an alkali-metal base in an approximately equimolecular ratio under pressure, at a temperature of between 350° to 425° C. while agitating the reaction mixture.

4. The method of making a di-diphenyl oxide, which comprises heating a chlorodiphenyl with aqueous sodium hydroxide in an approximately equimolecular ratio under pressure, at a temperature of between about 350° to 425° C.

5. The method of making a di-diphenyl oxide, which comprises heating a chlorodiphenyl with aqueous sodium hydroxide in an approximately equimolecular ratio under pressure, at a temperature of between about 350° to 425° C. with concurrent agitation, while substantially repressing the formation of phenylphenol by addition of the latter to the reaction mixture.

6. The method of making di-ortho-diphenyl oxide having the formula;

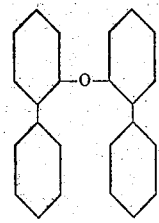

which comprises heating ortho-chlorodiphenyl with an aqueous solution of an alkali-metal base in an approximately equimolecular ratio, under pressure at a temperature between about 350° to 425° C.

7. The method of making di-ortho-diphenyl oxide having the formula;

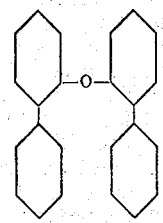

which comprises heating ortho-chlorodiphenyl with an aqueous solution of an alkali-metal base in an approximately equimolecular ratio, under pressure at a temperature between about 350° to 425° C. with concurrent agitation, while substantially repressing the formation of ortho-phenylphenol by addition of the latter to the reaction mixture.

8. The method of making di-para-diphenyl oxide having the formula;

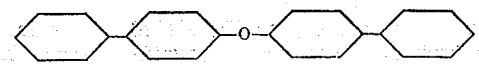

which comprises heating para-chlorodiphenyl with an aqueous solution of an alkali-metal base in an approximately equimolecular ratio, under pressure at a temperature between about 350° to 425° C.

9. The method of making di-para-diphenyl oxide having the formula;

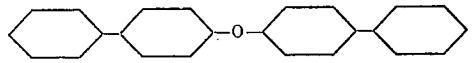

which comprises heating para-chlorodiphenyl with an aqueous solution of an alkali-metal base in an approximately equimolecular ratio, under pressure at a temperature between about 350° to 425° C. with concurrent agitation, while substantially repressing the formation of para-phenylphenol by addition of the latter to the reaction mixture.

10. The method of making a di-diphenyloxide which comprises reacting a chlorodiphenyl with an aqueous solution of an alkali metal base, the base being employed in amount not greatly exceeding the molecular equivalent of said chlorodiphenyl, and the reaction being carried out under super-atmospheric pressure at a temperature between about 350° and about 425° C.

WESLEY C. STOESSER.
ROBERT F. MARSCHNER.

Certificate of Correction

Patent No. 1,972,605. September 4, 1934.

WESLEY C. STOESSER ET AL.

It is hereby certified that errors appear in the printed specification of the above numbered patent requiring correction as follows: Page 1, lines 45 to 50, the equation should appear as shown below instead of as shown in the patent— same page, lines 58 to 64, the equation should appear as shown below instead of as shown in the patent—

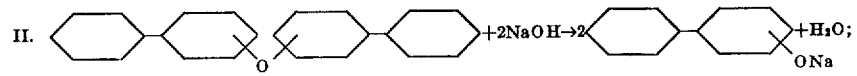

and that the said Letters Patent should be read with these corrections therein that the same may conform to the record of the case in the Patent Office.

Signed and sealed this 7th day of May, A. D. 1935.

[SEAL] LESLIE FRAZER,
*Acting Commissioner of Patents.*